(12) United States Patent
Buck

(10) Patent No.: US 8,998,173 B2
(45) Date of Patent: Apr. 7, 2015

(54) VALVE APPARATUS AND METHOD

(71) Applicant: David A. Buck, Arnaudville, LA (US)

(72) Inventor: David A. Buck, Arnaudville, LA (US)

(*) Notice: Subject to any disclaimer, the term of this patent is extended or adjusted under 35 U.S.C. 154(b) by 102 days.

(21) Appl. No.: 13/863,918

(22) Filed: Apr. 16, 2013

(65) Prior Publication Data

US 2014/0306138 A1 Oct. 16, 2014

(51) Int. Cl.
F16K 27/06 (2006.01)
E21B 34/14 (2006.01)
E21B 34/00 (2006.01)
F16K 5/06 (2006.01)

(52) U.S. Cl.
CPC .............. *F16K 5/0626* (2013.01); *F16K 27/067* (2013.01); *E21B 34/14* (2013.01); *E21B 2034/002* (2013.01)

(58) Field of Classification Search
CPC ... F16K 27/067; F16K 5/0647; F16K 5/0626; E21B 2034/002; E21B 34/14
USPC ............... 251/315.13, 315.01, 317.01, 315.1, 251/316, 314; 166/330, 332.3; 137/15.22, 137/15.18, 15.08
See application file for complete search history.

(56) References Cited

U.S. PATENT DOCUMENTS

| 3,346,002 | A | * | 10/1967 | Thompson, Jr. et al. | 137/246.22 |
| 4,023,773 | A | * | 5/1977 | Wise | 251/148 |
| 4,576,234 | A | * | 3/1986 | Upchurch | 166/319 |
| 5,117,858 | A | * | 6/1992 | Osthues et al. | 137/315.21 |
| 5,246,203 | A | | 9/1993 | McKnight et al. | |
| 5,529,285 | A | | 6/1996 | McKnight et al. | |
| 5,628,493 | A | | 5/1997 | McKnight et al. | |
| 5,738,336 | A | | 4/1998 | McKnight et al. | |

* cited by examiner

*Primary Examiner* — John K Fristoe, Jr.
*Assistant Examiner* — Michael R Reid
(74) *Attorney, Agent, or Firm* — Jones Walker, LLP

(57) ABSTRACT

In the specification and drawings a valve is described and shown with a lower valve seat; an upper valve seat; a bracket, the bracket having a first tongue engaged with the upper valve seat; a valve ball located between the lower valve seat and the upper valve seat, the lower valve seat, the valve ball, and the upper valve seat being located within the bracket; and a ring located about the upper valve seat, the ring having a first recessed portion and a first extended portion, the ring having a first ring position in which the first tongue is unobstructed by the first recessed portion and a second ring position in which the first tongue is obstructed by the first extended portion, the ring being rotatable between the first ring position and the second ring position.

13 Claims, 6 Drawing Sheets

VALVE APPARATUS AND METHOD

I. BACKGROUND

In the drilling of oil or gas wells with standard U.S. technology, a drive bushing is turned by a rotary table. The drive bushing has a square or hexagonal passage therethrough slidably receiving a long square or hexagonal member known as a kelly. One potential hazard in drilling for oil or gas is encountering pressures which are not balanced by drilling fluid in the hole. One of many safety devices are valves on the kelly, on the lower end immediately above the uppermost drill pipe joint and on the upper end between the kelly and the swivel. The idea is to actuate the blowout preventer to seal around the outside of the drill string and to close the kelly valve or valves to keep well fluids from returning through the drill string. An analogous valve, known as a safety valve, is used in analogous situations in completion and workover operations.

II. BRIEF DESCRIPTION OF THE SEVERAL VIEWS OF THE DRAWINGS

III. DETAILED DESCRIPTION

Figure 1:
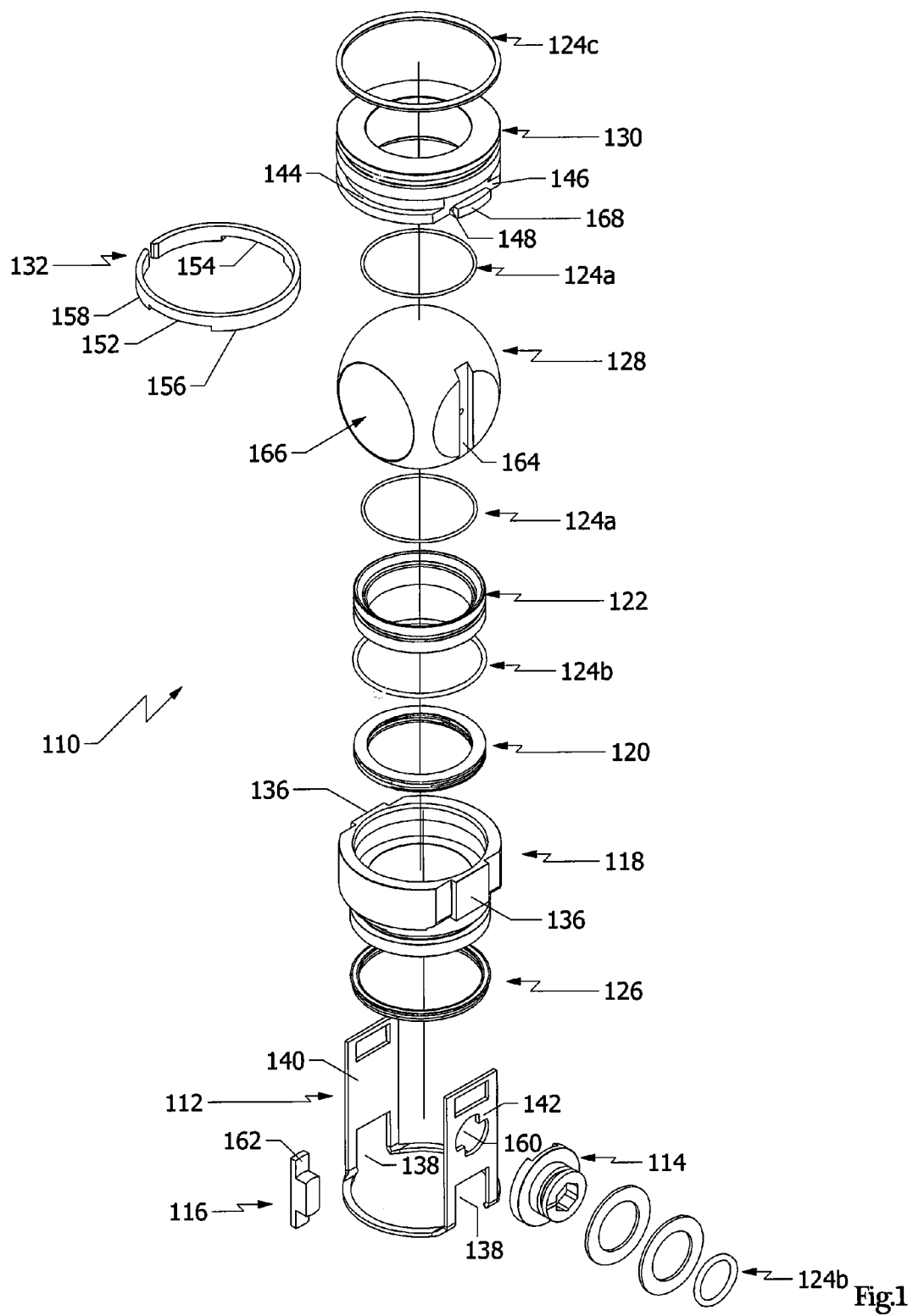
FIG. 1 is an exploded perspective view of an embodiment described herein.

As required, detailed embodiments of the present invention are disclosed herein. However, it is to be understood that the disclosed embodiments are merely exemplary of the invention, which can be embodied in various forms. As such, any feature(s) used in one embodiment can be used in another embodiment. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "connected" and/or "coupled," as used herein, are defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
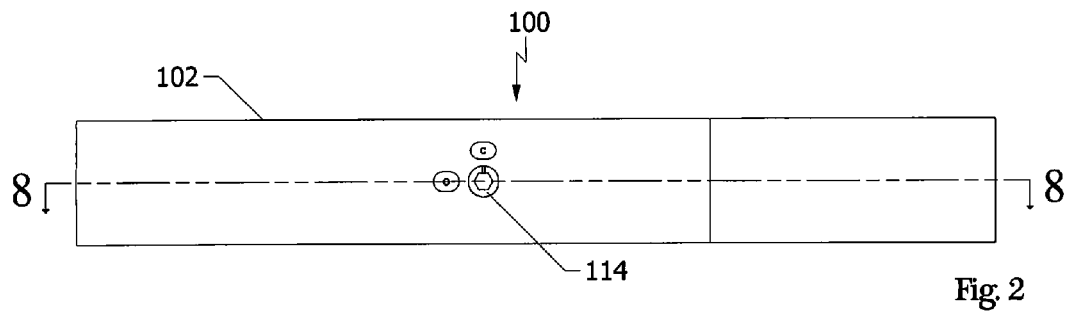
FIG. 2 is a side elevation view of an embodiment described herein.
Figure 3:
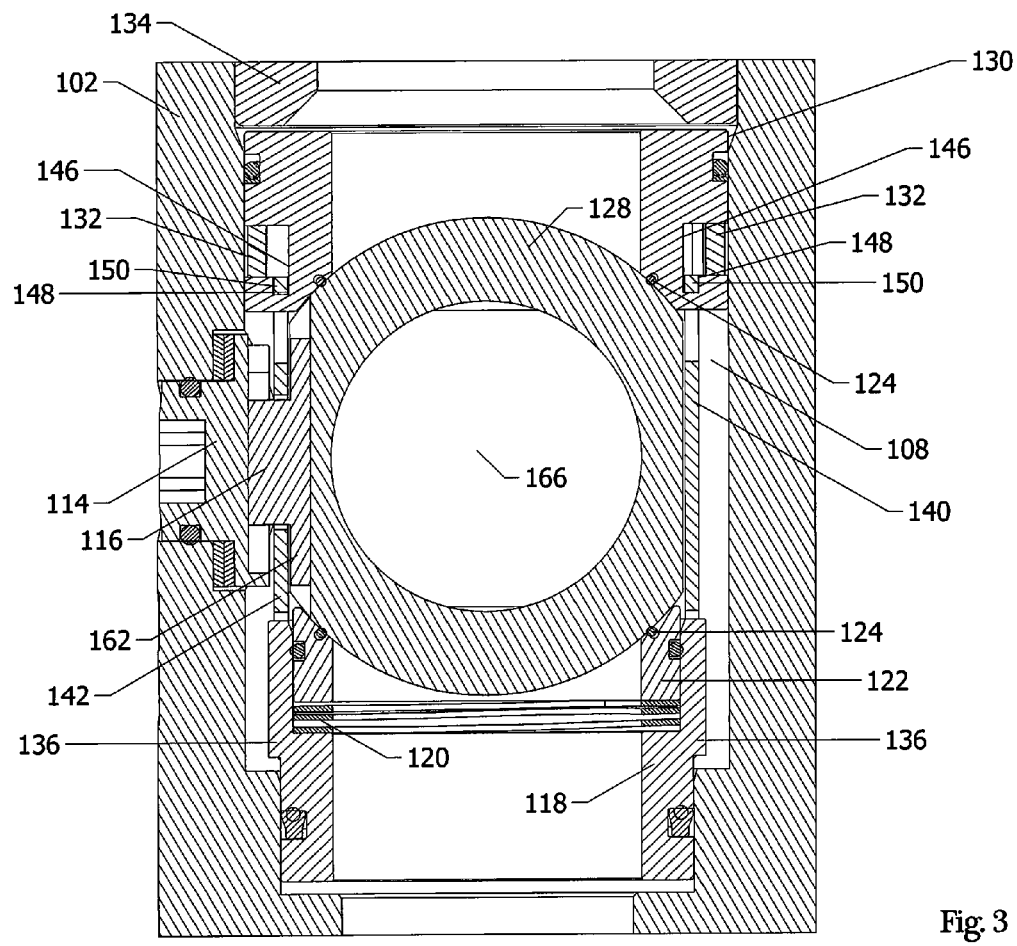
FIG. 3 is a sectional view of an embodiment described herein.
Figure 4:
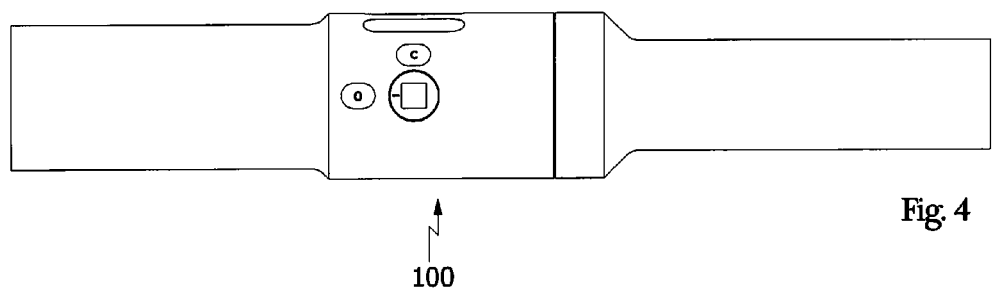
FIG. 4 is a side elevation view of an embodiment described herein.

Described now are exemplary embodiments. Referring to the drawings, beginning with FIGS. 1 to 3, an exemplary embodiment of a valve 100 is shown. The valve can be employed as a kelly valve, a safety valve, or any other application where a cartridge type valve or ball valve is employed. The valve 100 (FIG. 2) includes a housing 102 with a threaded drill pipe pin 101 at the lower end and a threaded drill pipe box at the upper end. In one embodiment, the housing 102 can be constructed of one piece, two pieces, or a plurality of pieces. As shown in FIG. 3, the valve housing 102 has a cavity 108 therein which can contain a valve mechanism 110.

Referring to FIG. 1, in this embodiment of valve mechanism 110 includes a bracket 112, an actuator or valve stem 114, an actuator key 116, a lower valve seat cartridge 118, a spring 120, a lower valve seat 122, seals 124 and 126, a valve ball 128, an upper valve seat 130, and a ring 132. In the embodiment of FIG. 1, seals 124*a* are teflon rings, seals 124*b* rubber o-rings, seals 124*c* parbak o-rings, and seal 126 a poly-pak ring. Naturally, these seals are merely one example of the many different combinations of seals which could be employed.

Figure 8:
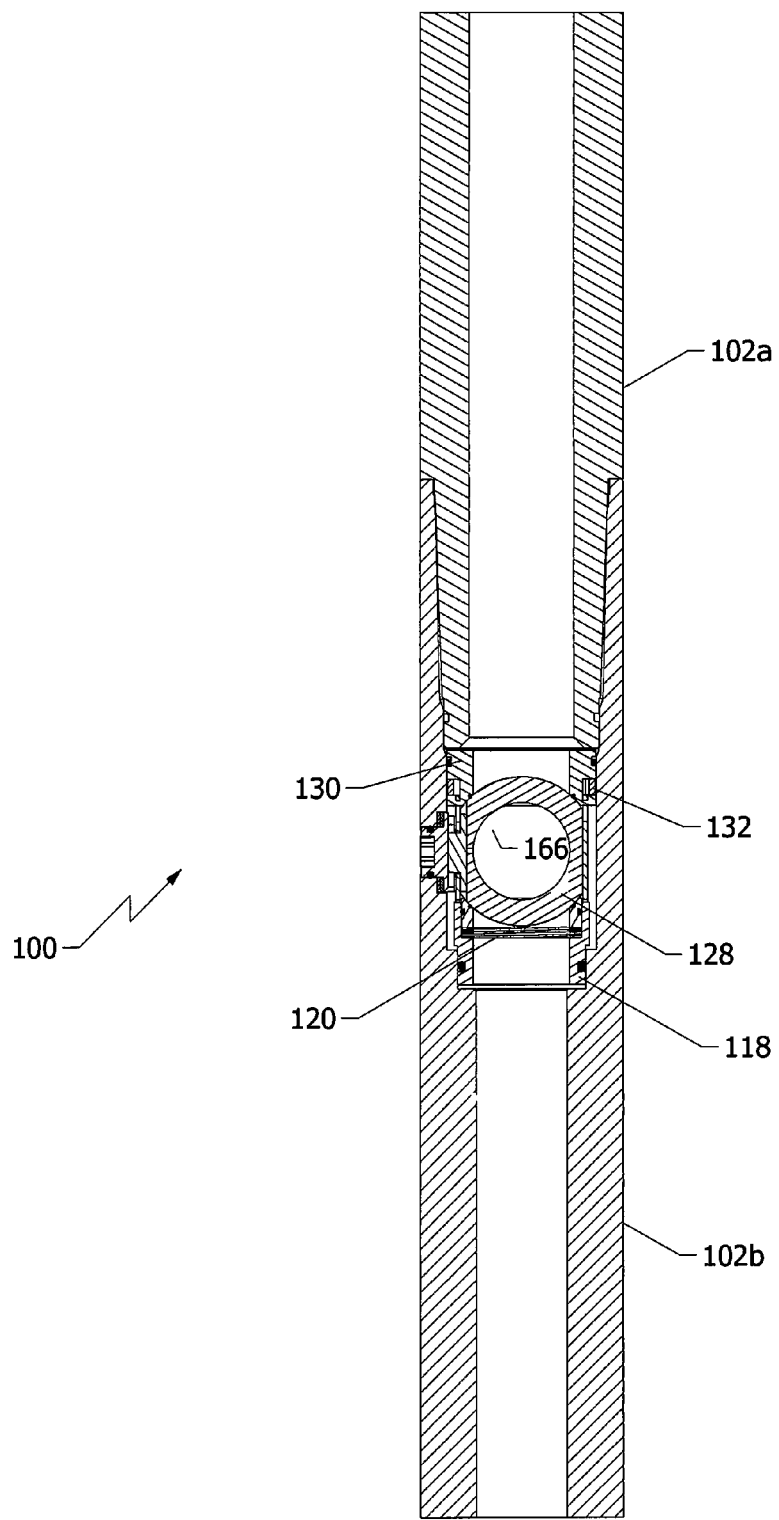
FIG. 8 is a section view of one valve embodiment within a sub housing.

The valve mechanism 110 can be secured within the housing 102 with cap 134 (FIG. 3). In one embodiment illustrated in FIG. 8, cap 134 may be formed by upper sub housing member 102*a* which threads into lower sub housing member 102*b*. Upper sub housing member 102*a* presses against upper valve seat 130 to secure it in place within lower sub housing member 102*b*. In an alternative embodiment not illustrated, the cap 134 may be an element separate from the upper sub housing and includes threads which mate with complementary threads on the inner wall of the housing 102, thereby allowing the cap 134 to be screwed into the housing 102 in order to secure the valve mechanism 110 within the housing 102. The valve mechanism 110 can be removed from the housing 102, for example in order to replace the valve mechanism 110 or to perform maintenance on the valve mechanism 110 (e.g., replace seals), by unscrewing the cap 134 and removing the valve mechanism 110 from the housing 102.

In this embodiment, when the valve mechanism 110 is in an assembled state, the lower valve seat cartridge 118 is seated against the lower portion of the bracket 112. The lower valve seat cartridge 118 can have one or more protrusions 136 which engage one or more corresponding slots 138 formed in a first tongue 140 and a second tongue 142 of the bracket 112, thereby securing the lower valve seat cartridge 118 to the bracket 112. All of the bracket 112 or portions of the bracket 112 (such as the first tongue 140 and the second tongue 142) can be constructed of a high strength, flexible material, such as a comparatively thin steel sheeting, including spring steel. In one example, the flexible material has a thickness ranging between about $50/1000$ of an inch and about $3/8$ of an inch, or any sub-range there between, although certain embodiments could be outside this range depending on the material used. In one preferred embodiment, bracket 112 is formed of spring steel about $100/1000$ of an inch thick. In certain preferred embodiments, bracket 112 is formed by water jetting or laser cutting the steel sheeting. Certain embodiments of bracket 112 are intended to be flexible by hand. In other words, the tongues 140 and 142 may be flexed apart sufficiently to allow the valve to be assembled and disassembled as described below. One example of being flexible by hand is flexing under about 10 lbs to 100 lbs force (or any sub-range there between) applied to the tongues 140 and 142.

The spring 120 is seated against the lower valve seat cartridge 118. The spring 120 can be a wave spring, a coiled spring, or any other type of spring or force exerting device (whether conventional or future developed). The lower valve seat 122 is positioned against spring 120 and valve ball 128 is seated against the lower valve seat 122. Upper valve seat 130 is engaged with first tongue 140 and the second tongue 142 of the bracket (as is further described below), and the upper valve seat 130 is positioned against the valve ball 128. Seal 124, such as a Teflon® O-ring, is positioned between the lower valve seat 122 and the valve ball 128, and seals against the passage of fluid between the lower valve seat 122 and the outer surface of the valve ball 128. Similarly, seal 124, such as a Teflon® O-ring, is positioned between the upper valve seat 130 and the valve ball 128, and seals against the passage of fluid between the upper valve seat 130 and the outer surface of the valve ball 128.

Figure 5:
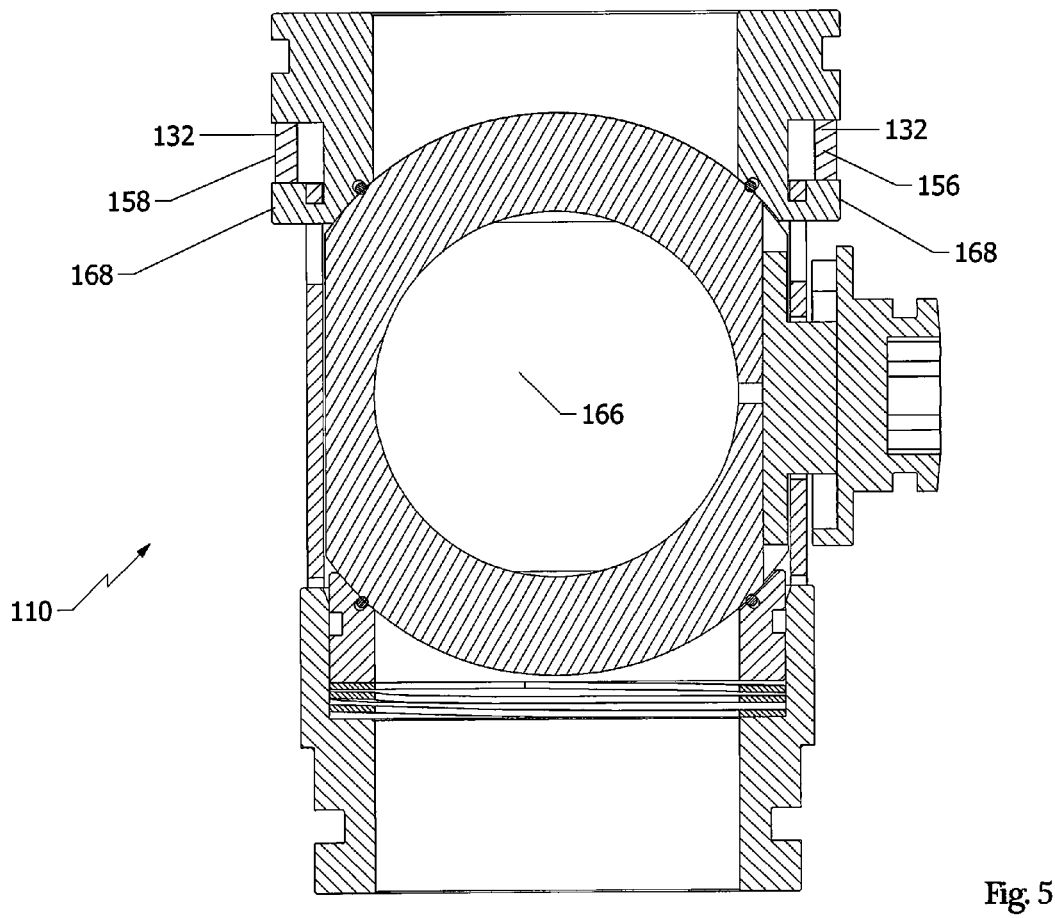
FIG. 5 is a sectional view of an embodiment described herein.
Figure 6:
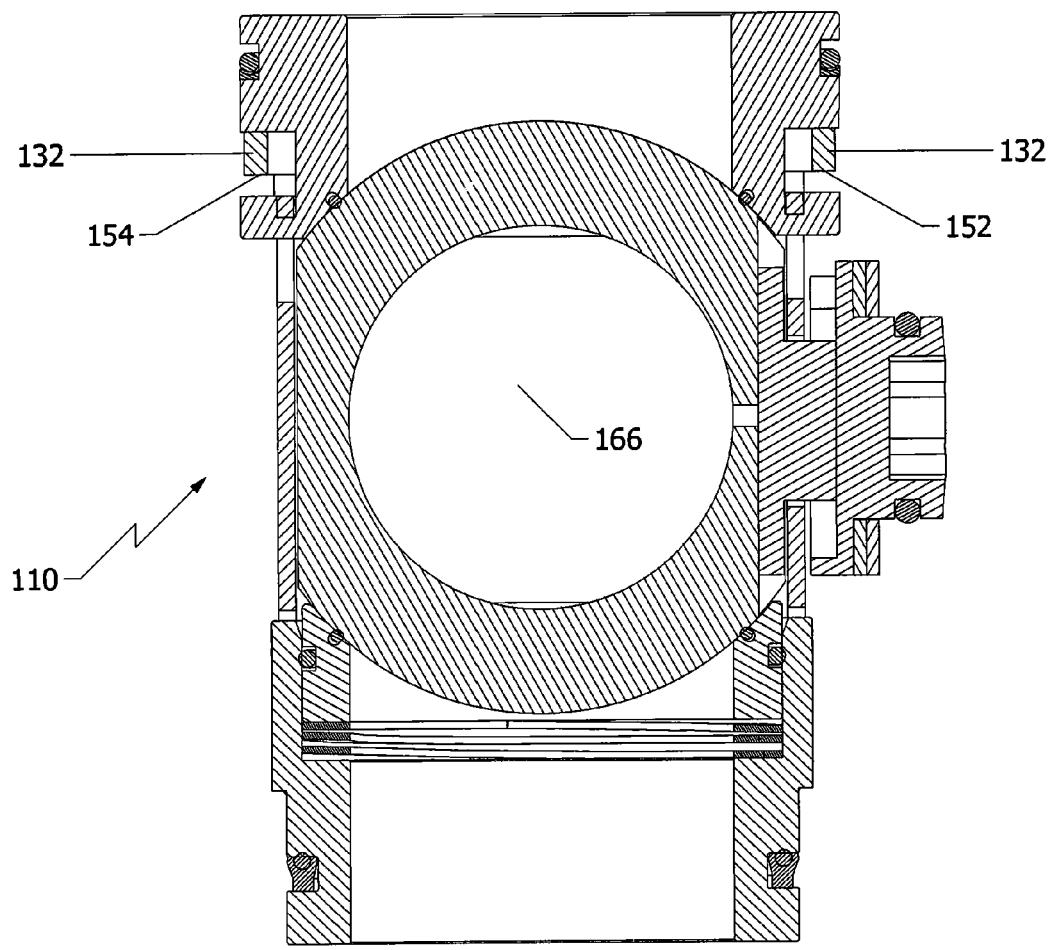
FIG. 6 is a sectional view of an embodiment described herein.

As shown in FIG. 1, in this embodiment the upper valve seat 130 includes a channel 144 around its circumference. As depicted in FIGS. 3, 5, and 6, the upper valve seat 130 includes a notch or planar section 146 and a side projection 168 extending from notch 146 with a channel or groove 148 formed in side projection 168. In this embodiment, the groove 148 is vertically extending in the sense that it extends into projection 168 in a direction of the axis along which the valve is assembled and disassembled, i.e., the line along which the parts are separated in FIG. 1. The first tongue 140 and second tongue 142 of the bracket 112 each include a lip 150 that engage notches 146, thereby connecting the bracket 112 to the upper valve seat 130.

In the illustrated embodiment, ring 132 is a split ring (as shown in FIG. 1), which can allow the ring 132 to be placed around or located about the upper valve seat 130, or removed from the upper valve seat 130. This ring 130 includes a first recessed portion 152, a second recessed portion 154, a first extended portion 156, and a second extended portion 158. In an assembled state, ring 132 sits within channel 144 and can be rotated around the upper valve seat 130 while traveling through the channel 144.

Figure 7:
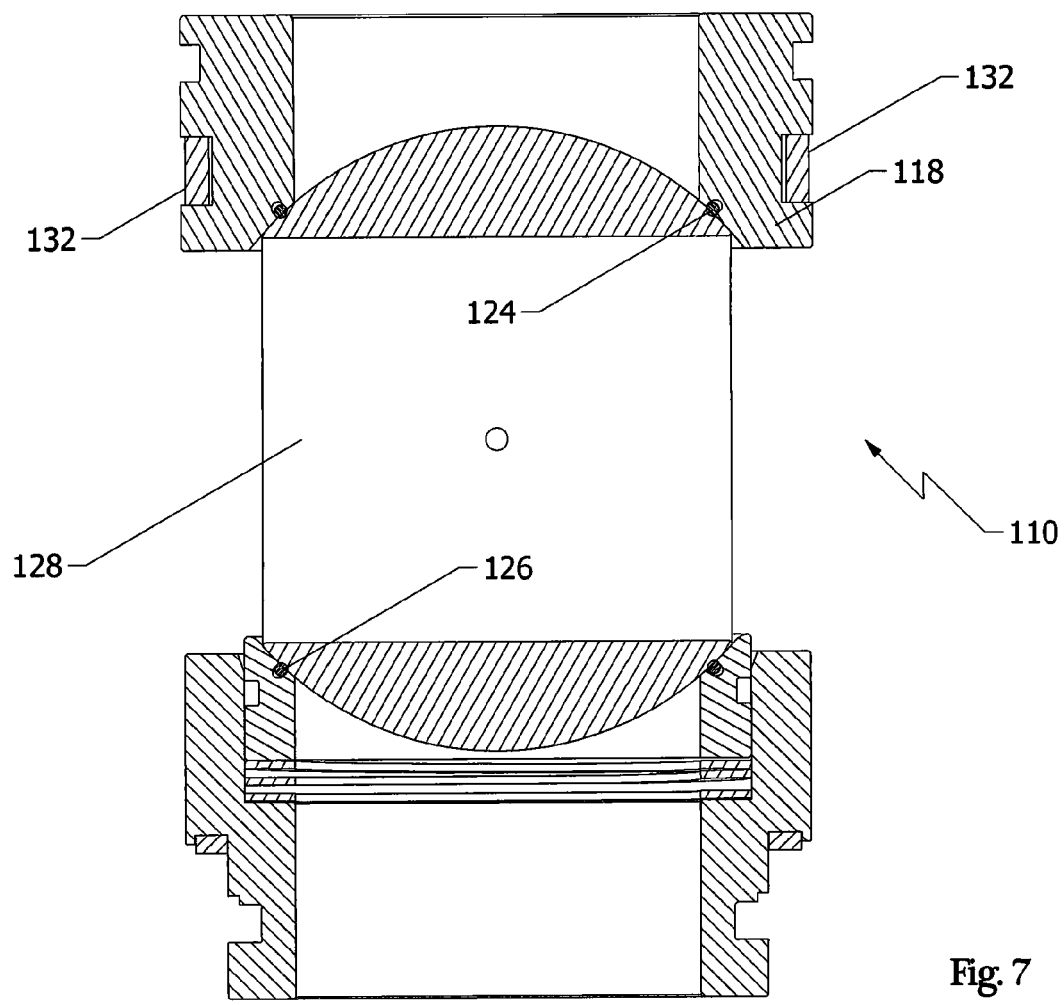
FIG. 7 is a sectional view of an embodiment described herein.

Referring to FIGS. 1, 3, 5, and 6, actuator 114 is connected to the actuator key 116 through opening 160 in the second tongue 142 of the bracket 112. The actuator key 116 includes a rib 162 that engages socket 164 of valve ball 128, thus mechanically connecting the actuator 114 with the valve ball 128. Rotation of the actuator 114 causes the valve ball 128 to rotate from a closed position (shown in FIGS. 3, 5, and 6) in which fluid is prevented from flowing through the valve mechanism 110, to an open position (not shown) in which fluid is able to flow through the valve mechanism 110 by traveling through passageway 166 of valve ball 128. FIG. 7 shows the valve mechanism of FIG. 6, but rotated 90 degrees about its vertical axis.

When the valve mechanism 110 is in an assembled state, the lower valve seat 122 and valve ball 128 are both biased toward the upper valve seat 130 by spring 120. The spring 120 sits in the lower valve seat cartridge 118 and exerts a force on the lower valve seat 122 which presses the lower valve seat 122 towards the upper valve seat 130, resulting in a compressive force between the lower valve seat 122, seals 124 and 126, valve ball 128, an upper valve seat 130. The compressive force can allow seals 124 and 126 to form a proper seal around the valve ball 128 which prevents the passage of fluids.

In operation of an embodiment, the valve mechanism 110 can be quickly and easily assembled without the use of specialized tools. For example, bracket 112, lower valve seat cartridge 118, spring 120, lower valve seat 122, seal 124, valve ball 128, and seal 126 are first seated against each other as described above. Next, first tongue 140 and second tongue 142 are flexed away from each other allowing side projections 168 of the upper valve seat 130 to pass between the lips 150 of the first tongue 140 and the second tongue 142, and allowing the upper valve seat 130 to be seated on the valve ball 128. The first tongue 140 and second tongue 142 are then flexed towards each other to engage lips 150 with notches 146. Next, the bracket 112 is moved downward such that the lips 150 additionally engage and sit within the adjacent grooves 148. The ring 132 is then located about the upper valve seat 130 and placed within channel 144. The ring 132 is next rotated around the upper valve seat 130 until the ring 132 reaches a second ring position (depicted in FIGS. 3 and 5) where the first extended portion 156 and the second extended portion 158 are substantially aligned with the respective projections 168, and in which the lips 150 of the first tongue 140 and the second tongue 142 are obstructed by, and are prevented from exiting the notches 146 by, the first extended portion 156 and the second extended portion 158, thereby securing the first tongue 140 and the second tongue 142 of the bracket 112 to the upper valve seat 130. The valve mechanism 110 can then be placed within the housing 102 and the cap 134 can be screwed onto the housing 102.

In operation of this embodiment, in order to disassemble the valve 100 and valve mechanism 110, the process described above is to a certain extent reversed. For example, the cap 134 can be unscrewed from the housing 102 and the valve mechanism 110 can be removed from the housing 102. The ring 132 is then rotated around the upper valve seat 130 until the ring 132 reaches a first ring position (depicted in FIG. 6) where the first recessed portion 152 and the second recessed portion 154 are substantially aligned with the respective projections 168, and in which the lips 150 of the first tongue 140 and the second tongue 142 are unobstructed by, and are able to exit the notches 146 by passage through, the first recessed portion 152 and the second recessed portion 154, thereby releasing the first tongue 140 and the second tongue 142 of the bracket 112 from the upper valve seat 130. If desired, the ring 132 can then be removed from the upper valve seat 130. Alternatively, the ring 132 can remain about the upper valve seat 130 located within channel 144, for example to allow for the quick and/or easy reassembly of the valve mechanism 110. Next, the bracket 112 is moved upward such that the lips 150 disengage from the grooves 148. The first tongue 140 and the second tongue 142 are then flexed away from each other to disengage lips 150 from notches 146. Next, first tongue 140 and second tongue 142 are flexed further away from each other (if necessary) allowing projections 168 of the upper valve seat 130 to pass between the lips 150 of the first tongue 140 and the second tongue 142, and allowing the upper valve seat 130 to be unseated from the valve ball 128. Bracket 112, lower valve seat cartridge 118, spring 120, lower valve seat 122, seal 124, valve ball 128, and seal 126 can then be unseated from each other. The above procedure can also allow the valve mechanism 110 to be quickly and easily disassembled without the use of specialized tools. If desired, seals 124, 126, and/or other components of the valve mechanism 110 can be repaired or replaced for example when the valve mechanism is in a disassembled or partially disassembled state. The valve 100 and valve mechanism 110 can then be reassembled for continued use.

The embodiments shown in the drawings and described above are exemplary of numerous embodiments that may be made within the scope of the appended claims. For example, while the illustrated embodiments disclose utilizing the ring 132 to help retain the tongues 140 and 142 of bracket 112, other embodiments could completely exclude the ring 132 and simply rely on the spring biasing lip 150 to remain in groove 148. It is also contemplated that numerous other configurations may be used, and the material of each component may be selected from numerous materials other than those specifically disclosed. In short, it is the applicant's intention that the scope of the patent issuing herefrom will be limited only by the scope of the appended claims.

I claim:

1. A valve, comprising:
   a lower valve seat;
   an upper valve seat;
   a bracket comprising at least a first and a second tongue engaged with the upper valve seat;
   a valve ball located between the lower valve seat and the upper valve seat, the lower valve seat, the valve ball, and the upper valve seat being located within the bracket; and
   a ring located about the upper valve seat, the ring comprising at least a first and a second recessed portion and at least a first and a second extended portion, the ring having a first ring position in which the tongues are unobstructed by the recessed portions and a second ring position in which the tongues are obstructed by the extended portions, the ring being rotatable between the first ring position and the second ring position.

2. The valve of claim 1, wherein the upper valve seat further comprises a notch and the first tongue further comprises a lip, the lip being engaged with the notch.

3. The valve of claim 2, wherein the upper valve seat further comprises a groove adjacent to the notch, the lip being engaged with the groove.

4. The valve of claim 1, wherein at least a portion of the bracket is flexible.

5. The valve of claim 4, wherein the first tongue is configured to be disengaged from the upper valve seat by the flexing of at least a portion of the bracket.

6. The valve of claim 1, further comprising a spring, the valve ball being biased by the spring.

7. The valve of claim 4, wherein the bracket is formed of a metal and the metal is sufficiently thin to allow the bracket to be flexed away from the upper valve seat by application of a force of less than about 100 lbs.

8. A method of assembling/disassembling a valve, comprising:
   locating a lower valve seat within a bracket;
   locating a valve ball within the bracket;
   locating an upper valve seat within the bracket;
   locating a ring about the upper valve seat;
   engaging at least a first and a second tongue of the bracket with the upper valve seat through at least a first and a second recessed portion of the ring;
   rotating the ring so that the first tongues of the bracket are obstructed by at least a first and a second extended portion of the ring.

9. The method of claim 8, wherein rotating the ring further comprises rotating the ring so that the second tongue of the bracket is obstructed by a second extended portion of the ring.

10. The method of claim 9, further comprising rotating the ring so that the first tongue of the bracket is unobstructed by the first recessed portion of the ring and the second tongue of the bracket is unobstructed by the second recessed portion of the ring.

11. The method of claim 8, further comprising rotating the ring so that at least the first tongue of the bracket is unobstructed by the first recessed portion of the ring.

12. A valve, comprising:
   a lower valve seat;
   an upper valve seat including a side projection extending therefrom, the side projection having a vertical extending channel formed therein;
   a bracket, the bracket comprising a first tongue engaging with the upper valve seat by way of a lip of the tongue resting within the channel of the side projection;
   a valve ball located between the lower valve seat and the upper valve seat, the lower valve seat, the valve ball, and the upper valve seat being located within the bracket; and
   wherein (i) a spring biases the lip of the tongue to remain positioned within the channel and (ii) the spring is configured to be compressed sufficiently to allow the lip of the tongue to move above the channel and off of the side projection.

13. The valve of claim 12, wherein the side projection extends from a planar section on the upper valve seat.

* * * * *